United States Patent
Zhao et al.

(10) Patent No.: US 12,442,769 B2
(45) Date of Patent: Oct. 14, 2025

(54) HIGH-STABILITY SURFACE-ENHANCED RAMAN SCATTERING NANOTAG AND MAKING METHOD THEREFOR

(71) Applicant: SOUTHEAST UNIVERSITY, Nanjing (CN)

(72) Inventors: Xiangwei Zhao, Nanjing (CN); Ruihua Fei, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 121 days.

(21) Appl. No.: 18/008,575

(22) PCT Filed: Feb. 16, 2022

(86) PCT No.: PCT/CN2022/076392
§ 371 (c)(1),
(2) Date: Dec. 6, 2022

(87) PCT Pub. No.: WO2023/284296
PCT Pub. Date: Jan. 19, 2023

(65) Prior Publication Data
US 2025/0052684 A1    Feb. 13, 2025

(30) Foreign Application Priority Data

Jul. 14, 2021 (CN) .......................... 202110793566.4

(51) Int. Cl.
G01N 21/65    (2006.01)
(52) U.S. Cl.
CPC ................................. G01N 21/658 (2013.01)

(58) Field of Classification Search
CPC ....... B82Y 20/00; B82Y 30/00; G01N 21/658
See application file for complete search history.

(56) References Cited

U.S. PATENT DOCUMENTS

| | | | |
|---|---|---|---|
| 2016/0256548 A1* | 9/2016 | Haber | A61K 47/6923 |
| 2018/0171287 A1* | 6/2018 | Xu | G01J 3/44 |
| 2020/0217798 A1* | 7/2020 | Suh | C12Q 1/6816 |

FOREIGN PATENT DOCUMENTS

WO    WO-2019004804 A2 *  1/2019  ............. C12Q 1/689

* cited by examiner

*Primary Examiner* — Jennifer Wecker
(74) *Attorney, Agent, or Firm* — CBM PATENT CONSULTING, LLC

(57) ABSTRACT

A nanotag includes a gold core, the gold core is sequentially coated with a silver shell and a gold shell, and a Raman dye is arranged between the silver shell and the gold shell; further it discloses a making method for a high-stability SERS nanotag that includes the following steps: a. adding tetrachloroauric acid into ultrapure water, after boiling, quickly adding trisodium citrate, continuously boiling for a few minutes, stopping heating, and cooling; b. adding hexadecyl trimethyl ammonium chloride (CTAC) into product obtained in the step a, stirring, and then adding ascorbic acid and AgNO$_3$, and centrifugating and resuspending in the CTAC; c. adding CTAC into product obtained in the step b, stirring, adding a Raman dye, ascorbic acid and sodium hydroxide, injecting a mixture of tetrachloroauric acid and potassium iodide, and centrifuge the mixture and resuspending in the CTAC.

9 Claims, 5 Drawing Sheets

HIGH-STABILITY SURFACE-ENHANCED RAMAN SCATTERING NANOTAG AND MAKING METHOD THEREFOR

TECHNICAL FIELD

The present disclosure relates to tags and making methods therefor, in particular to a high-stability surface-enhanced Raman scattering nanotag and a making method therefor.

BACKGROUND ART

On account of excellent photostability and multifunctional characteristics, surface-enhanced Raman scattering (SERS) coding nanotags are broadly applied in sensing, photocatalysis, biological imaging and other fields. Nowadays, the SERS nanotags are commonly made of gold and silver, which have their own advantages and disadvantages. For example, the gold nanotag is easy to synthesize and has oxidation resistance, but enhances a low-frequency electromagnetic field. On the contrary, the silver nanotag enhances a high-frequency electromagnetic field, but is difficult to synthesize and likely to be oxidized. Thus, gold-silver composite SERS nanotags, which have the advantages of both the gold nanotag and the silver nanotag, have been widely used in recent years.

However, the gold-silver composite SERS nanotags currently still have two main problems. One is that a silver shell can be oxidized due to electroreplacement in a synthesis process, causing long-stem storage impossible. The other one is that when the nanotag is marked by a Raman dye, the dye should carry a sulfhydryl group and is covalently connected to the nanotag via a gold-sulfur bond, resulting in a limitation on the coding capacity of the nanotag.

Therefore, how to make a high-stability SERS nanotag having a high coding capacity becomes a problem to be urgently solved at present.

SUMMARY

Objectives of the present disclosure: in order to overcome the defects of traditional methods, one objective of the present disclosure is to provide a high-stability SERS nanotag, and another objective of the present disclosure is to provide a making method for a high-stability SERS nanotag.

Technical solution: the high-stability SERS nanotag in the present disclosure includes a gold core sequentially coated with a silver shell and a gold shell, and a Raman dye for generating Raman signal is arranged between the silver shell and the gold shell.

Further, the gold core has a particle size of 5 nm to 100 nm. The particle size of the gold core is adjusted by the quantity of an added reducing agent, and the more the reducing agent, the less the particle size of the gold core. The silver shell has a thickness of 2 nm to 50 nm. The thickness of the silver shell is adjusted by the quantity of added silver nitrate, and the more the silver nitrate, the greater the thickness of the silver shell. The gold shell has a thickness of 1 nm to 10 nm. The particle size of the gold core and the thickness of the silver shell are related to Raman signal intensity of a final nanotag.

Further, the Raman dye is connected to the nanotag through covalent or adsorption. The sulfhydryl or sulfhydryl-free Raman dyes include one or more of 4-Mercaptobenzoic acid (4-MBA), 5,5'-Dithiobis (2-nitrobenzoic acid) (DTNB), nile blue (NB), methylene blue (MB), crystal violet (CV), malachite green (MG) and rhodamine 6G (R6G).

The above making method for a high-stability SERS nanotag includes the following steps:

a: making an Au core: adding tetratetrachloroauric acid into ultrapure water, and quickly adding reductant with a mass volume ratio of 1~2% after boiling, stopping heating after a few minutes, and cooling to 24° C. to 37° C.;

b: making Au@Ag: adding hexadecyl trimethyl ammonium chloride (CTAC) with a concentration of 0.01 mM to 1 mM into the product of step (a), stirring, subsequently adding ascorbic acid and injecting $AgNO_3$, then centrifuging and resuspending in CTAC with a concentration of 1 mM to 10 mM; and c: making Au@Ag$^{dye}$@Au: adding CTAC with a concentration of 20 mM to 100 mM into the product of step (b), stirring, sequentially adding a Raman dye, ascorbic acid and sodium hydroxide, then injecting a mixture of tetrachloroauric acid and potassium iodide, then centrifuging and resuspending in CTAC with a concentration of 1 mM to 10 mM.

Further, in the step (a), the reducing agent is trisodium citrate, sodium borohydride, white phosphorus or ascorbic acid.

Further, in the step (c), the CTAC with a concentration of 20 mM to 100 mM has a volume of 1 mL to 100 mL, and the substance obtained in the step (b) has a volume of 1 mL to 100 mL. The Raman dye has a volume of 0.1 mL to 1 mL and a concentration of 0.1 mM to 10 mM, the ascorbic acid has a volume of 10 mL to 100 mL and a concentration of 50 mM to 200 mM, and the sodium hydroxide has a volume of 10 mL to 100 mL and a concentration of 100 mM to 400 mM. The sodium hydroxide is used for adjusting a pH value of the solution, so as to enhance the reducing capacity of the ascorbic acid, and to inhibit galvanic replacement. However, an overhigh concentration of the sodium hydroxide will lead to agglomeration of the gold core and the silver shell, such that a concentration of the sodium hydroxide should be controlled in an appropriate range.

Further, in the step (c), an injection speed of the mixture is 50 μl/min to 1000 μl/min, the mixture of tetrachloroauric acid and potassium iodide has a volume of 50 mL to 500 mL, the tetrachloroauric acid has a concentration of 0.1 mM to 0.5 mM, and the potassium iodide has a concentration of 0.1 mM to 2 mM. The tetrachloroauric acid is reduced and deposited on surfaces of the gold core and the silver shell to form the gold shell. The gold shell prevents the silver shell from being damaged, and prevents the Raman dye from leaking, so as to maintain stability of the Raman signal of the nanotag. The potassium iodide may reduce a reduction potential of the tetrachloroauric acid, inhibit galvanic replacement, and prevent the silver shell from being damaged, so as to form a complete gold shell. A ratio of the potassium iodide to the tetrachloroauric acid should be controlled, otherwise excessive potassium iodide will be adsorbed on the surface of gold shell to reduce a reaction speed. The CTAC keeps a solution stable, and prevents agglomeration of the gold core and the silver shell.

Further, a rotational speed of centrifugation is 3000 rpm to 5000 rpm, and time is 5 min to 30 min.

Beneficial effects: compared with the prior methods, the present disclosure has the following remarkable characteristics:

1. Ultrastrong stability: the silver shell of the tag is protected by the compact gold shell, so as to prevent the silver shell from being oxidized, the tag may be stored for one year or above, and the Raman signal is stable.
2. Ultrahigh coding capacity: the Raman dye is coated between the silver shell and the gold shell through adsorption, the compact gold shell on the outermost layer prevents the Raman dye from leaking, the used Raman dye is not required to carry a sulfydryl group, an application range is wide, and the tag may have an ultrahigh coding capacity.
3. Desirable monodispersity: desirable monodispersity is contributive to improving storage stability of the tag and efficiency of coupling biomolecules.
4. High Raman signal intensity: high Raman signal intensity is contributive to improving sensitivity of the tag in immunoassay, molecular diagnosis and other applications.

DETAILED DESCRIPTION OF THE EMBODIMENTS

Example 1

Figure 1:
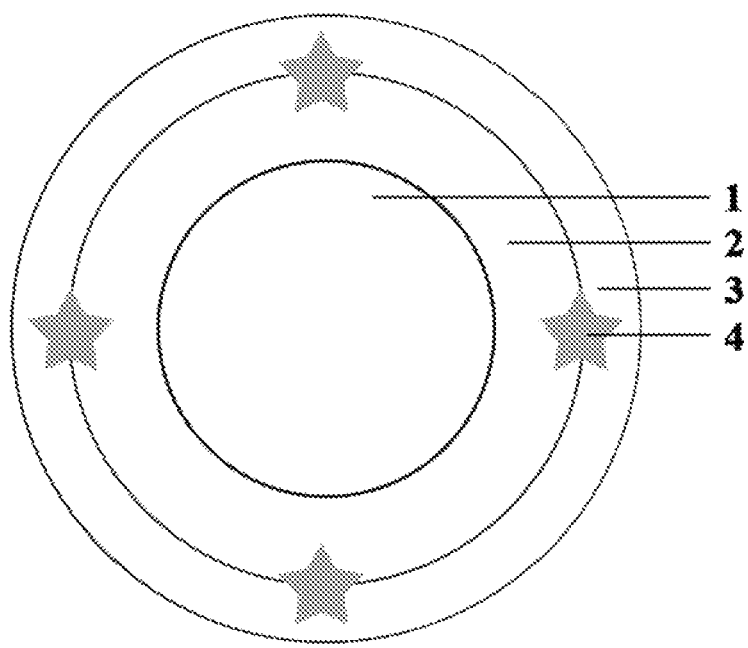
FIG. 1 is a schematic structural diagram of the present disclosure.

A making method for a high-stability SERS includes the following steps:
a. make an Au core: add 1 mL of tetratetrachloroauric acid with a mass concentration of 1% (w/v) into 97.5 mL of ultrapure water, after boiling, quickly add 1.5 mL of trisodium citrate with a mass concentration of 1% (w/v) as a reducing agent. continuously boil for 10 min, stop heating, and cool to 24° C.;
b. make Au@Ag: add 5 mL of CTAC with a concentration of 1 mM into 50 mL of the product of step (a), stir at a room temperature, then add 5 mL of ascorbic acid with a concentration of 40 mM, inject 5 mL of AgNO$_3$ with a concentration of 20 mM by an injection pump at a speed of 100 μl/min, and after 1 h of reaction, centrifuge a mixture at a rotational speed of 5000 rpm for 15 min twice and resuspend in 50 mL of CTAC with a concentration of 1 mM;
c. make Au@Ag$^{NB}$@Au: add 50 mL of CTAC with a concentration of 40 mM into 50 mL of a substance obtained in the step b, stir at a room temperature, sequentially add 0.5 mL of nile blue (NB) with a concentration of 1 mM as a Raman dye 4, 40 mL of ascorbic acid with a concentration of 100 mM, and 40 mL of sodium hydroxide with a concentration of 200 mM, inject 100 mL of a mixture of tetrachloroauric acid with a concentration of 0.2 mM and potassium iodide with a concentration of 0.48 mM at an injection speed of 500 μl/min, and after 4 h of reaction, centrifuge the mixture at a rotational speed of 5000 rpm for 15 min and resuspend in 50 mL of CTAC with a concentration of 1 mM.

Figure 2A:
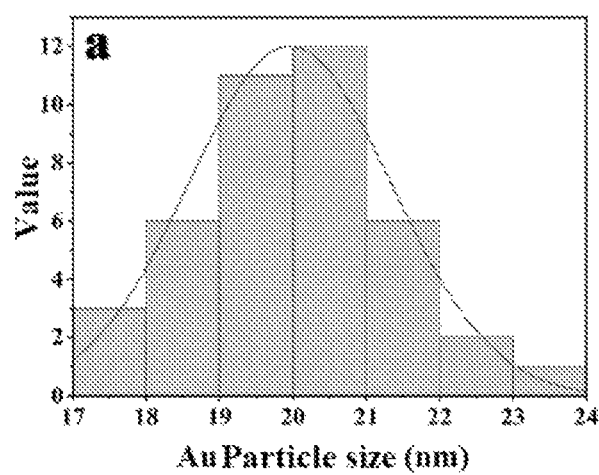
FIG. 2a is a particle size distribution diagram of the present disclosure: Au.
Figure 2B:
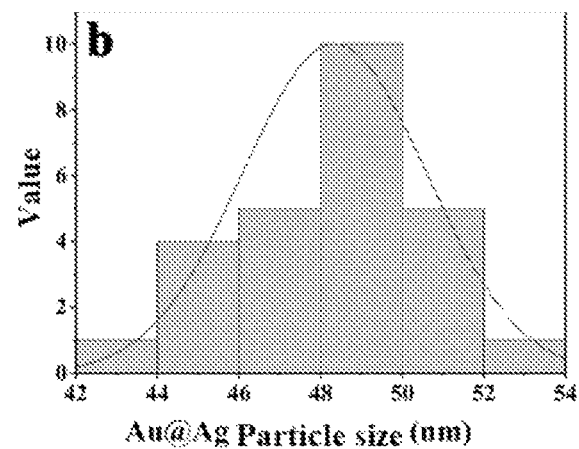
FIG. 2b is a particle size distribution diagram of the present disclosure: Au@Ag.
Figure 2C:
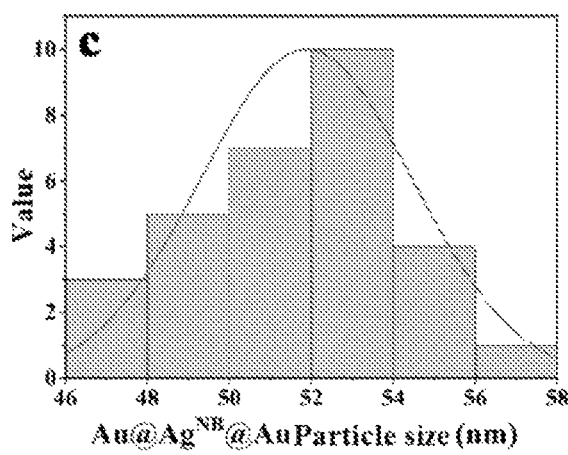
FIG. 2c is a particle size distribution diagram of the present disclosure: Au@Ag$^{NB}$@Au.

As shown in FIGS. 1 and 2, a gold core 1 of the obtained Au@Ag$^{NB}$@Au SERS coding nanotag has a particle size of 20 nm, the gold core 1 is sequentially coated with a silver shell 2 with a particle size of 14 nm and a gold shell 3 with a particle size of 2 nm, and the nile blue (NB) as the Raman dye 4 is coated between the silver shell 2 and the gold shell 3, and is connected to the nanotag through adsorption to generate a Raman signal.

The above made Au@Ag$^{NB}$@Au SERS coding nanotag may be applied to lateral flow immunoassay with a structure that a sample pad, a combination pad, a detection line, a quality control line and a water absorption pad are sequentially laterally arranged. Through a "double antibody sandwich method", a detection antibody is coupled to the SERS nanotag to be fixed on the combination pad of a test strip, a coating antibody is fixed on the detection line of the test strip, and a secondary antibody is fixed on the quality control line of the test strip. After being dripped into the sample pad, a sample laterally flows to the combination pad by means of a capillary force to be combined with the nanotag, then the mixture flows to the detection line and the quality control line to generate a corresponding affinity reaction to present colors, the redundant sample solution is collected by the water absorption pad, and finally a corresponding Raman signal is detected.

The above made Au@Ag$^{NB}$@Au SERS coding nanotag may be further applied to vertical flow immunoassay, and has a structure that a detection pad and a water absorption pad are vertically stacked. Also through the "double antibody sandwich method", a detection antibody is coupled to the SERS nanotag for subsequent use, and the coating antibody is fixed on the detection pad. After being dripped on the detection pad, a sample is combined with the coating antibody, then the nanotag is dripped to be combined with an antigen to be fixed on the detection pad to present colors, the redundant reagent vertically flow to the water absorption pad after washing, and finally a corresponding Raman signal is detected.

Control Example 1

Make Au@Ag$^{NB}$: carry out the step a and the step b in Example 1, add 50 mL of CTAC with a concentration of 40 mM into 50 mL of Au@Ag, stir at a room temperature, add 0.5 mL of nile blue (NB) with a concentration of 1 mM, and after 4 h of reaction, centrifuge a mixture at a rotational speed of 5000 rpm for 15 min twice and resuspend in 50 mL of CTAC with a concentration of 1 mM.

Control Example 2

A traditional method for making Au@Ag$^{NB}$@Au: carry out the step a and the step b in example 1, add 50 mL of CTAC with a concentration of 40 mM into 50 mL of Au@Ag, stir at a room temperature, sequentially add 0.5 mL of nile blue (NB) with a concentration of 1 mM, and 40 mL of ascorbic acid with a concentration of 100 mM, inject 100 mL of HAuCl$_4$ with a concentration of 0.2 mM by an injection pump at a speed of 500 µl/min, and after 4 h of reaction, centrifuge a mixture at a rotational speed of 5000 rpm for 15 min twice and resuspend in 50 mL of CTAC with a concentration of 1 mM.

Figure 3A:
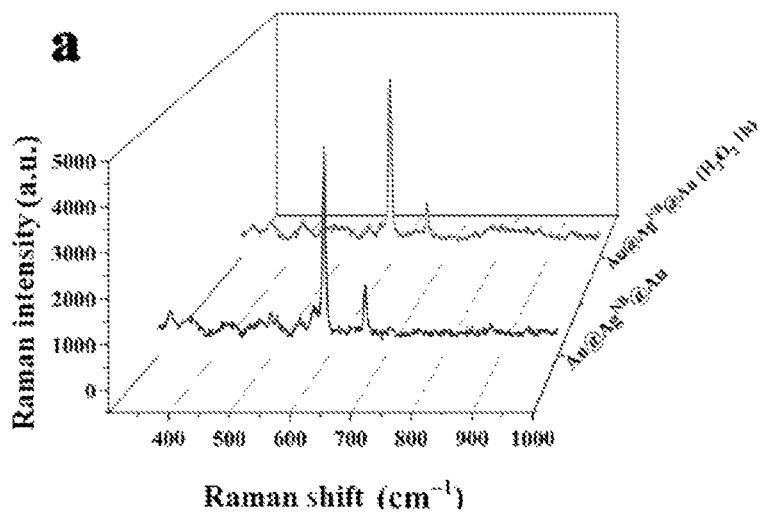
FIG. 3a is an oxidation resistance comparison diagram of the present disclosure: Au@Ag$^{NB}$@Au nanotag made in Example 1.
Figure 3B:
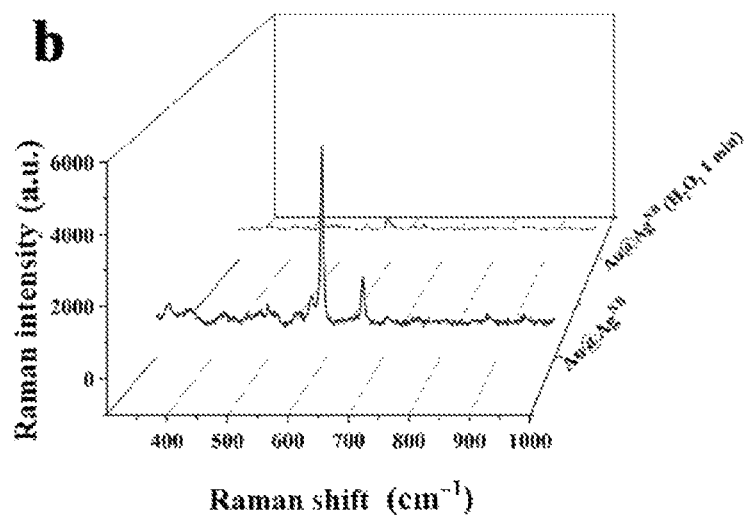
FIG. 3b is an oxidation resistance comparison diagram of the present disclosure: Au@Ag$^{NB}$nanotag made in Comparative Example 1.
Figure 3C:
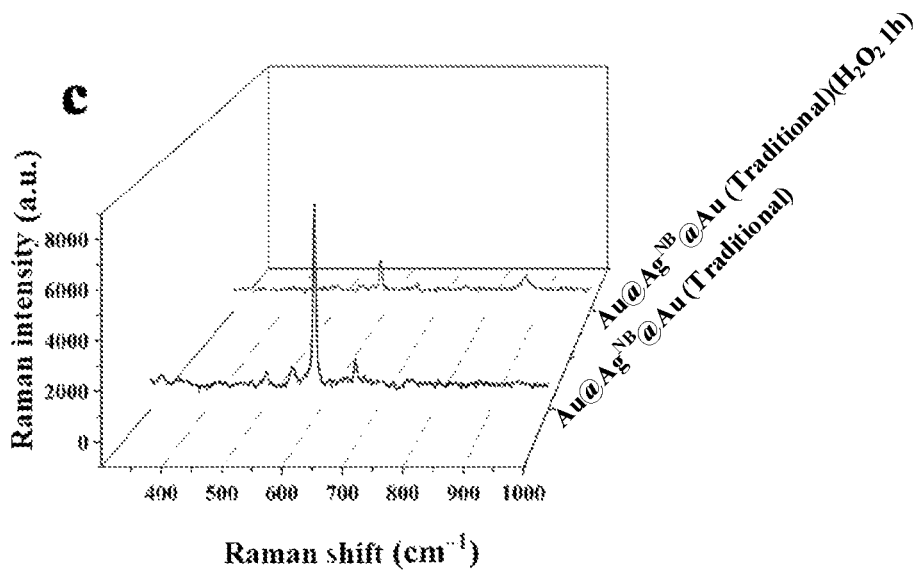
FIG. 3c is an oxidation resistance comparison diagram of the present disclosure: Au@Ag$^{NB}$@Au nanotag made in Comparative Example 2.

Anti-oxidation test: add 33 µl of commercially available hydrogen peroxide with a mass concentration of 30% (w/v) into 1 mL of Au@Ag$^{NB}$@Au made in example 1, Au@Ag$^{NB}$ made in control example 1, and Au@Ag$^{NB}$@Au made in control example 2, and then detect respectively Raman signals after 1 min and 1 h. As shown in FIG. 3, it can be seen that the Raman signal of the Au@Ag$^{NB}$@Au treated with hydrogen peroxide has no obvious change, while the Raman signals of the Au@Ag$^{NB}$ and the traditional Au@Ag$^{NB}$@Au treated with hydrogen peroxide are sharply decreased. It is indicated that the compact gold shell 3 on the outermost layer of the Au@Ag$^{NB}$@Au tag made in example 1 prevents the silver shell 2 from being oxidized and damaged, and prevents the Raman dye 4 from leaking. However, since the Au@Ag$^{NB}$ and the traditional Au@Ag$^{NB}$@Au are not coated with gold shells on the outermost layers or gold shells are not compact, the silver shells are oxidized, the dyes leak, and the Raman signals are decreased.

Figure 4:
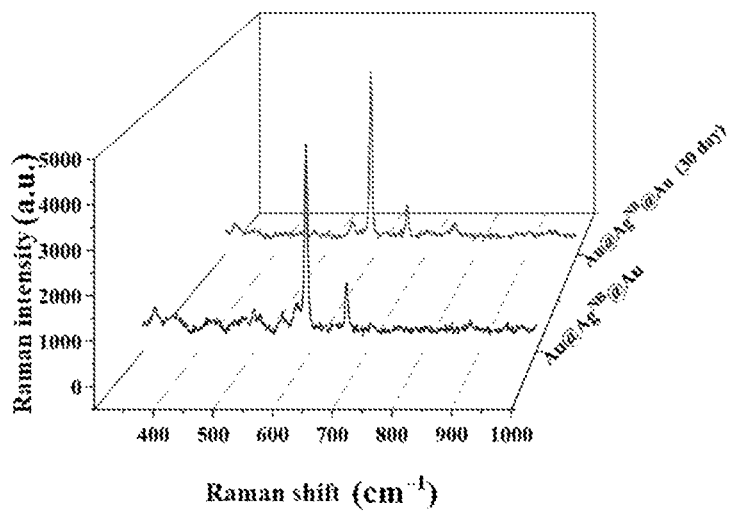
FIG. 4 is a Raman spectrogram of an Au@Ag$^{NB}$@Au nanotag in the present disclosure after being stored for 30 days.

As shown in FIG. 4, after the Au@Ag$^{NB}$@Au nanotag made in example 1 is stored for 30 days, the Raman signal has no obvious change. It is indicated that being protected by the gold shell 3, the silver shell 2 of the tag is prevented from being oxidized by oxygen in the air. Moreover, it is indicated that being protected by the gold shell 3, the Raman dye 4 is prevented from leaking. Therefore, the Raman signal of the tag is stable, and the tag may be stored for a long time.

Example 2

A making method for a high-stability SERS nanotag includes the following steps:
a. add 1 mL tetratetrachloroauric acid with a mass concentration of 1% (w/v) into 98.6 mL of ultrapure water, after boiling, quickly add 0.4 mL of trisodium citrate with a mass concentration of 1% (w/v) as a reducing agent, and after continuously boiling for 10 min, stop heating, and cool to 24° C.;
b. add 5 mL of CTAC with a concentration of 0.5 mM into a substance obtained in the step (a), stir at a room temperature, then add 5 mL of ascorbic acid with a concentration of 40 mM, inject 10 mL of AgNO$_3$ with a concentration of 20 mM by an injection pump at a speed of 100 µl/min, and after 1 h of reaction, centrifuge a mixture at a rotational speed of 5000 rpm for 15 min twice and resuspend in 50 mL of CTAC with a concentration of 1 mM;
c. add 1 mL of CTAC with a concentration of 20 mM into 1 mL of a substance obtained in the step b, stir at a room temperature, sequentially add 0.1 mL of 4-Mercaptobenzoic acid (4-MBA) with a concentration of 0.1 mM as a Raman dye 4, 100 mL of ascorbic acid with a concentration of 50 mM, and 100 mL of sodium hydroxide with a concentration of 100 mM, inject 200 mL of a mixture of tetratetrachloroauric acid with a concentration of 0.5 mM and potassium iodide with a concentration of 2 mM at an injection speed of 50 µl/min, and after 4 h of reaction, centrifuge a mixture at a rotational speed of 3000 rpm for 5 min and resuspend in 50 mL of CTAC with a concentration of 1 mM.

A gold core 1 of the obtained Au@Ag$^{4\text{-}MBA}$@Au SERS coding nanotag has a particle size of 100 nm, the gold core 1 is sequentially coated with a silver shell 2 with a particle size of 20 nm and a gold shell 3 with a particle size of 5 nm, and 4-Mercaptobenzoic acid (4-MBA) as the Raman dye 4 is coated between the silver shell 2 and the gold shell 3, and is covalently connected to the nanotag through adsorption to generate a Raman signal.

Example 3

A making method for a high-stability SERS nanotag includes the following steps:
a. add 1 mL of tetratetrachloroauric acid with a mass concentration of 1% (w/v) into 97.5 mL of ultrapure water, add 0.5 mL of K$_2$CO$_3$ with a concentration of 0.2 M, and stir at a room temperature; and quickly add 1 mL of newly prepared sodium borohydride with a concentration of 0.5 mg/mL as a reducing agent, repeat the above operation for 3 times until a solution is changed from bluish violet into orange red, and store at 24° C. for subsequent use;
b. add 5 mL CTAC with a concentration of 0.2 mM into a substance obtained in the step (a), stir at a room temperature, add 5 mL of ascorbic acid with a concentration of 40 mM, injecting 0.5 mL of AgNO$_3$ with a concentration of 20 mM by an injection pump at a speed of 100 µl/min, and after 1 h of reaction, centrifuge a mixture at a rotational speed of 5000 rpm for 15 min twice and resuspend in 50 mL of CTAC with a concentration of 1 mM; and
c. add 100 mL of CTAC with a concentration of 100 mM into 100 mL of a substance obtained in the step b, stir at a room temperature, sequentially add 0.1 mL of 5,5'-Dithiobis (2-nitrobenzoic acid) (DTNB) with a concentration of 0.1 mM as a Raman dye 4, 10 mL of ascorbic acid with a concentration of 200 mM, and 10 mL of sodium hydroxide with a concentration of 400 mM, inject 50 mL of a mixture of tetratetrachloroauric acid with a concentration of 0.1 mM and potassium iodide with a concentration of 0.1 mM at an injection speed of 1000 µl/min, and after 4 h of reaction, centrifuge a mixture at a rotational speed of 5000 rpm for 30 min and resuspend in 50 mL of CTAC with a concentration of 1 mM.

A gold core 1 of the obtained Au@Ag$^{DTNB}$@Au SERS coding nanotag has a particle size of 5 nm, the gold core 1 is sequentially coated with a silver shell 2 with a particle size of 2 nm and a gold shell 3 with a particle size of 1 nm, and the 5,5'-Dithiobis (2-nitrobenzoic acid) (DTNB) as the Raman dye 4 is coated between the silver shell 2 and the gold shell 3, and is covalently connected to the nanotag to generate a Raman signal.

Example 4

A making method for a high-stability SERS nanotag includes the following steps:
a. add 1 mL of tetratetrachloroauric acid with a mass concentration of 1% (w/v) into 97.5 mL of ultrapure water, add 0.5 mL of K$_2$CO$_3$ with a molarity of 0.2 M, and carry out stirring for uniform mixing; quickly add 1 mL of a newly prepared ether solution with white phosphorus with a mass concentration of 20% (w/v) as a reducing agent, and carry out stirring for uniform mixing for 5 min; and carry out heating and boiling for about 10 min until the solution is changed from brownish red into orange red, stop heating, and cool to 30° C.;

b. add CTAC with a concentration of 0.1 mM into a substance obtained in the step (a), stir at a room temperature, add 5 mL of ascorbic acid with a concentration of 40 mM, inject 1 mL of AgNO₃ with a concentration of 20 mM by an injection pump at a speed of 100 μl/min, and after 1 h of reaction, centrifuge a mixture at a rotational speed of 5000 rpm for 15 min twice and resuspend in 50 mL of CTAC with a concentration of 1 mM; and c. add 50 mL of CTAC with a concentration of 60 mM into 50 mL of a substance obtained in the step b, stir at a room temperature, sequentially add 0.5 mL of methylene blue (MB) with a concentration of 5 mM as a Raman dye 4, 35 mL of ascorbic acid with a concentration of 125 mM, and 35 mL of sodium hydroxide with a concentration of 250 mM, inject 150 mL of a mixture of tetratetrachloroauric acid with a concentration of 0.3 mM and potassium iodide with a concentration of 1 mM at an injection speed of 525 μl/min, and after 4 h of reaction, centrifuge a mixture at a rotational speed of 4000 rpm for 18 min and resuspend in 50 mL of CTAC with a concentration of 5 mM.

A gold core 1 of the obtained Au@Ag$^{MB}$@Au SERS coding nanotag has a particle size of 5 nm, the gold core 1 is sequentially coated with a silver shell 2 with a particle size of 5 nm and a gold shell 3 with a particle size of 3 nm, and the methylene blue (MB) as the Raman dye 4 is coated between the silver shell 2 and the gold shell 3, and is connected to the nanotag through adsorption to generate a Raman signal.

Figure 5:
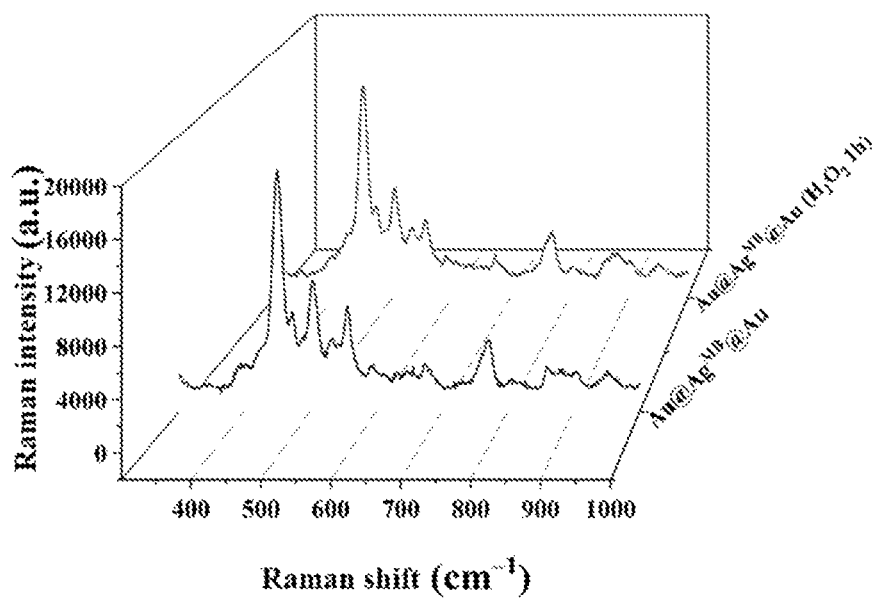
FIG. 5 is a Raman spectrogram of an Au@Ag$^{MB}$@Au nanotag in the present disclosure.

As shown in FIG. 5, after the Au@Ag$^{MB}$@Au SERS coding nanotag obtained in Example 4 is treated with hydrogen peroxide, the Raman signal has no obvious change. It is indicated that the methylene blue (MB) as the Raman dye may be also used for making the SERS coding nanotag through this making method.

Example 5

A making method for a high-stability SERS nanotag includes the following steps:

a. add 1 mL of tetratetrachloroauric acid with a mass concentration of 1% (w/v) into 96.5 mL of ultrapure water, add 1.5 mL of K₂CO₃ with a molarity of 0.2 M, and carry out stirring for uniform mixing; and quickly add 1 mL of newly prepared ascorbic acid with a mass concentration of 0.7% (w/v) as a reducing agent, carry out heating and boiling for about 10 min, stop heating, and cool to 27° C.;

b. add CTAC with a concentration of 0.05 mM into a substance obtained in the step (a), stir at a room temperature, add 5 mL of ascorbic acid with a concentration of 40 mM, inject 4 mL of AgNO₃ with a concentration of 20 mM by an injection pump at a speed of 100 μl/min, and after 1 h of reaction, centrifuge a mixture at a rotational speed of 5000 rpm for 15 min twice and resuspend in 50 mL of CTAC with a concentration of 1 mM; and c. add 10 mL of CTAC with a concentration of 30 mM into 10 mL of a substance obtained in the step b, stir at a room temperature, sequentially add 0.2 mL of crystal violet (CV) with a concentration of 2 mM as a Raman dye 4, 80 mL of ascorbic acid with a concentration of 60 mM, and 80 mL of sodium hydroxide with a concentration of 120 mM, inject 500 mL of a mixture of tetratetrachloroauric acid with a concentration of 0.2 mM and potassium iodide with a concentration of 0.3 mM at an injection speed of 100 μl/min, and after 4 h of reaction, centrifuge a mixture at a rotational speed of 3500 rpm for 10 min and resuspend in 50 mL of CTAC with a concentration of 3 mM.

A gold core 1 of the obtained Au@Ag$^{CV}$@Au SERS coding nanotag has a particle size of 10 nm, the gold core 1 is sequentially coated with a silver shell 2 with a particle size of 12 nm and a gold shell 3 with a particle size of 10 nm, and the crystal violet (CV) as the Raman dye 4 is coated between the silver shell 2 and the gold shell 3, and is connected to the nanotag through adsorption to generate a Raman signal.

Figure 6:
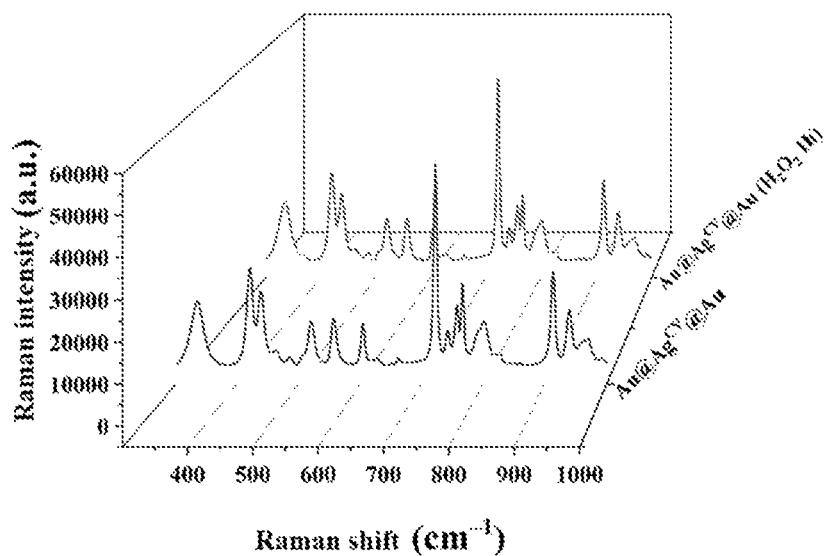
FIG. 6 is a Raman spectrogram of an Au@Ag$^{CV}$@Au nanotag in the present disclosure.

As shown in FIG. 6, after the Au@Ag$^{CV}$@Au SERS coding nanotag obtained in Example 5 is treated with hydrogen peroxide, the Raman signal has no obvious change. It is indicated that the crystal violet (CV) as the Raman dye 4 may be also used for making the SERS coding nanotag through the making method.

Example 6

A making method for a high-stability SERS nanotag includes the following steps:

a. add 1 mL tetratetrachloroauric acid with a mass concentration of 1% (w/v) into 98 mL of ultrapure water, quickly add 1 mL of trisodium citrate with a mass concentration of 1% (w/v) as a reducing agent after boiling, after continuously boiling for 10 min, stop heating, and cool to 37° C.;

b. add CTAC with a concentration of 0.02 mM into a substance obtained in the step (a), stir at a room temperature, add 5 mL of ascorbic acid with a concentration of 40 mM, inject 10 mL of AgNO₃ with a concentration of 20 mM by an injection pump at a speed of 100 μl/min, and after 1 h of reaction, centrifuge a mixture at a rotational speed of 5000 rpm for 15 min twice and resuspend in 50 mL of CTAC with a concentration of 1 mM; and c. addg 90 mL of CTAC with a concentration of 90 mM into 95 mL of a substance obtained in the step b, stir at a room temperature, sequentially add 0.1 mL of malachite green (MG) with a concentration of 10 mM as a Raman dye 4, 39 mL of ascorbic acid with a concentration of 190 mM, and 39 mL of sodium hydroxide with a concentration of 380 mM, inject 350 mL of a mixture of tetratetrachloroauric acid with a concentration of 0.4 mM and potassium iodide with a concentration of 1.8 mM at an injection speed of 900 μl/min, and after 4 h of reaction, centrifuge a mixture at a rotational speed of 4500 rpm for 25 m and resuspend in 50 mL of CTAC with a concentration of 8 mM.

A gold core 1 of the obtained Au@Ag$^{MG}$@Au SERS coding nanotag has a particle size of 50 nm, the gold core 1 is sequentially coated with a silver shell 2 with a particle size of 20 nm and a gold shell 3 with a particle size of 7 nm, and the malachite green (MG) as the Raman dye 4 is coated between the silver shell 2 and the gold shell 3, and is connected to the nanotag through adsorption to generate a Raman signal.

Example 7

A making method for a high-stability SERS nanotag includes the following steps:

a. add 1 mL tetratetrachloroauric acid with a mass concentration of 1% (w/v) into 98.4 mL of ultrapure water, quickly add 0.6 mL of trisodium citrate with a mass concentration of 1% (w/v) as a reducing agent after boiling, after continuously boiling for 10 min, stop heating, and cool to 29° C.;

b. add CTAC with a concentration of 0.01 mM into a substance obtained in the step (a), stir at a room temperature, add 20 mL of ascorbic acid with a concentration of 40 mM, inject 20 mL of $AgNO_3$ with a concentration of 20 mM by an injection pump at a speed of 100 μl/min, and after 1 h of reaction, centrifuge a mixture at a rotational speed of 5000 rpm for 15 min twice and resuspend in 50 mL of CTAC with a concentration of 1 mM; and c. add 30 mL of CTAC with a concentration of 50 mM into 40 mL of a substance obtained in the step b, stir at a room temperature, sequentially add 1 mL of rhodamine 6G (R6G) with a concentration of 2 mM as a Raman dye 4, 40 mL of ascorbic acid with a concentration of 100 mM, and 40 mL of sodium hydroxide with a concentration of 200 mM, inject 200 mL of a mixture of tetratetrachloroauric acid with a concentration of 0.2 mM and potassium iodide with a concentration of 0.8 mM at an injection speed of 400 μl/min, and after 4 h of reaction, centrifuge a mixture at a rotational speed of 3900 rpm for 9 min and resuspend in 50 mL of CTAC with a concentration of 4 mM.

A gold core 1 of the obtained Au@Ag$^{R6G}$@Au SERS coding nanotag has a particle size of 70 nm, the gold core 1 is sequentially coated with a silver shell 2 with a particle size of 50 nm and a gold shell 3 with a particle size of 4 nm, and the rhodamine 6G (R6G) as the Raman dye 4 is coated between the silver shell 2 and the gold shell 3, and is connected to the nanotag through adsorption to generate a Raman signal.

What is claimed is:

1. A method for preparing a high-stability SERS nanotag, comprising the following steps:
   (a) adding tetratetrachloroauric acid into ultrapure water, quickly adding a reducing agent with a mass to volume ratio of 1% to 2% after boiling, continuously carrying out boiling, stopping heating, and carrying out cooling to 24° C. to 37° C.;
   (b) adding CTAC with a concentration of 0.01 mM to 1 mM into a substance obtained in the step (a), carrying out stirring, adding ascorbic acid, injecting $AgNO_3$, and carrying out centrifugation after reaction and resuspending in CTAC with a concentration of 1 mM to 10 mM; and
   (c) adding CTAC with a concentration of 20 mM to 100 mM into a substance obtained in the step (b), carrying out stirring, sequentially adding
   a Raman dye, ascorbic acid and sodium hydroxide, injecting a mixture of tetratetrachloroauric acid and potassium iodide, and carrying out centrifugation after reaction and resuspending in CTAC with a concentration of 1 mM to 10 mM;
   wherein the high-stability SERS nanotag comprises a gold core (1), wherein the gold core (1) is sequentially coated with a silver shell (2) and a gold shell (3), and a Raman dye (4) is arranged between the silver shell (2) and the gold shell (3).

2. The method according to claim 1, wherein in the step (a), the reducing agent is trisodium citrate, sodium borohydride, white phosphorus or ascorbic acid.

3. The method according to claim 1, wherein in the step (c), the CTAC with a concentration of 20 mM to 100 mM has a volume of 1 mL to 100 mL, and the substance obtained in the step (b) has a volume of 1 mL to 100 mL.

4. The method according to claim 1, wherein in the step (c), the Raman dye has a volume of 0.1 mL to 1 mL and a concentration of 0.1 mM to 10 mM, the ascorbic acid has a volume of 10 mL to 100 mL and a concentration of 50 mM to 200 mM, and the sodium hydroxide has a volume of 10 mL to 100 mL and a concentration of 100 mM to 400 mM.

5. The method according to claim 1, wherein in the step (c), an injection speed is 50 μl/min to 1000 μl/min, the mixture of tetrachloroauric acid and potassium iodide has a volume of 50 mL to 500 mL, the tetrachloroauric acid has a concentration of 0.1 mM to 0.5 mM, and the potassium iodide has a concentration of 0.1 mM to 2 mM.

6. The method according to claim 1, wherein the gold core (1) has a particle size of 5 nm to 100 nm.

7. The method according to claim 1, wherein the silver shell (2) has a thickness of 2 nm to 50 nm.

8. The method according to claim 1, wherein the gold shell (3) has a thickness of 1 nm to 10 nm.

9. The method according to claim 1, wherein the Raman dye (4) is one or more of 4-Mercaptobenzoic acid, 5,5'-Dithiobis (2-nitrobenzoic acid), nile blue, methylene blue, crystal violet, malachite green and rhodamine 6G.

* * * * *